Figure 1:
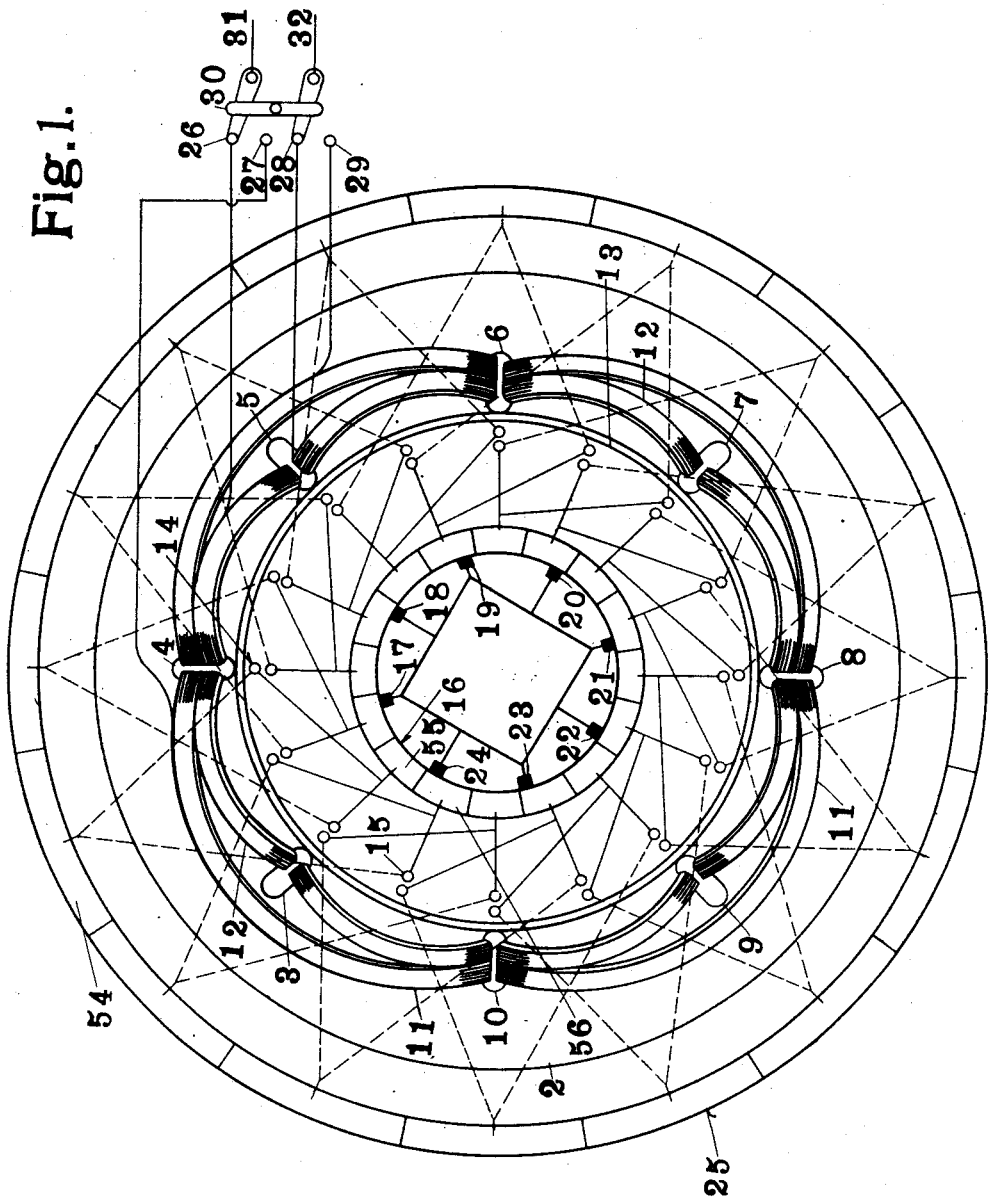

H. WEICHSEL.
ALTERNATING CURRENT MOTOR.
APPLICATION FILED APR. 12, 1915.

1,209,086.

Patented Dec. 19, 1916.
2 SHEETS—SHEET 1.

WITNESS

INVENTOR
Hans Weichsel
BY
ATTORNEY

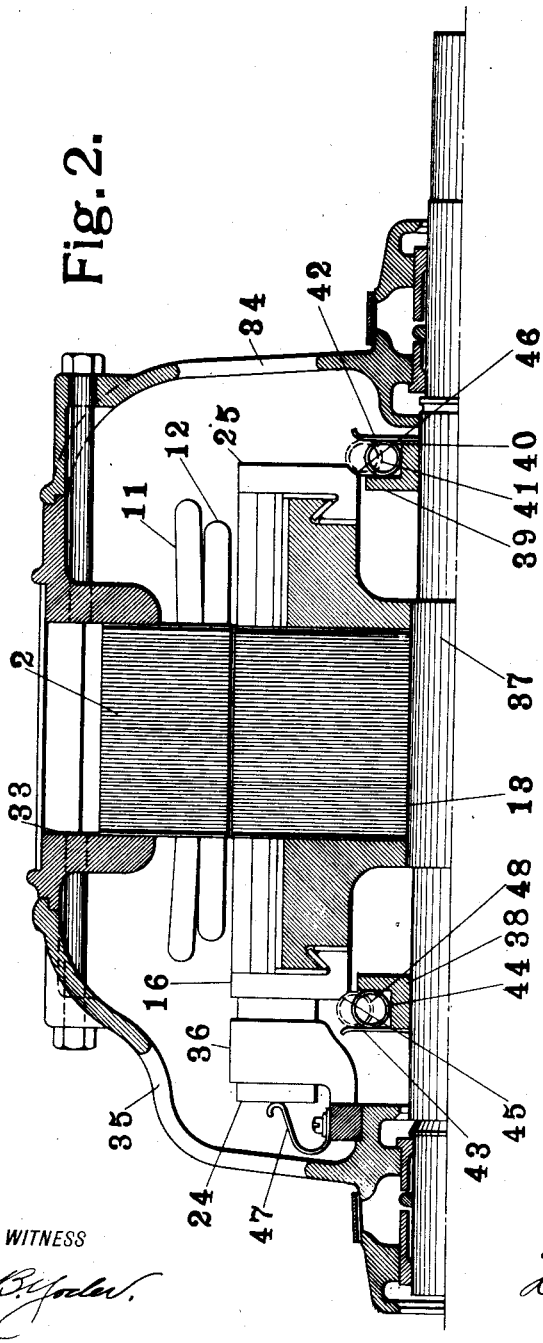

UNITED STATES PATENT OFFICE.

HANS WEICHSEL, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

ALTERNATING-CURRENT MOTOR.

1,209,086.  Specification of Letters Patent.  Patented Dec. 19, 1916.

Application filed April 12, 1915. Serial No. 20,698.

*To all whom it may concern:*

Be it known that I, HANS WEICHSEL, a subject of the Emperor of Germany, residing at the city of St. Louis, State of Missouri, United States of America, have invented a certain new and useful Alternating-Current Motor, of which the following is such a full, clear, and exact description as will enable any one skilled in the art to which it appertains to make and use the same, reference being had to the accompanying drawings, forming part of this specification.

My invention relates more particularly to single-phase asynchronous induction motors having a shunt characteristic and capable of being operated at a plurality of speeds. In another application, I have described a machine of this type provided with means for producing different numbers of stator poles and with a rotor carrying a commuted winding adapted to coöperate with brushes and also capable of being totally short-circuited, and so selecting the step of the commuted winding that the latter will permit the machine to be started as a commutator motor while it will also be capable of coöperating, as the short-circuited pole winding, with any of the pole numbers which the stator can produce.

This invention relates to an improvement in the machine above referred to and its object is to make it possible to utilize the rotor copper to its full extent in normal operation, with all of the available numbers of stator poles, and I achieve this object by so short-circuiting the commuted rotor winding as to convert the same into one or more squirrel cage windings, or their equivalent, as opposed to the one or more short-circuited pole windings of the machine described in the application referred to. By "pole winding" I refer to a winding which is composed of a number of coils having at least one turn and a pitch of the same order of magnitude as a stator pole pitch.

In the accompanying drawings, which illustrate one embodiment of my invention, Figure 1 diagrammatically indicates the stator and rotor windings; Fig. 2 illustrates a convenient mechanical construction of the machine and of the short-circuiting devices used in connection with the rotor winding; Fig. 3 is an end view of a part of one commutator and its short-circuiting device.

Referring more particularly to Fig. 1, 2 represents the stator, which is provided with the slots 3 to 10 inclusive and carries a 4-pole winding 11 comprising four coils each spanning two teeth and connected in series between the terminals 27 and 29, and also an 8-pole winding 12 comprising eight coils each spanning one tooth and connected in series between the terminals 26 and 28. The two-pole switch 30 makes it possible for the mains 31, 32 to be connected either to the 4-pole or to the 8-pole stator winding. In the figure, these mains are shown connected to the 8-pole winding. The rotor 13 carries a number of conductors, such as 14, 15, preferably located in slots or holes in the iron laminations and connected to two commutators, 16 and 25. The rotor winding is preferably of the parallel or lap type, as shown in Fig. 1, and its step or pitch is so chosen as to be greater than the pitch of the larger number of stator poles and smaller than that of the smaller number of stator poles. In this case, the pitch of the 8-pole stator winding embraces 45 degrees, while the pitch of the 4-pole winding embraces 90 degrees. The step of the commuted rotor winding has been chosen, by way of example, to embrace about $67\frac{1}{2}$ degrees, as may be seen by following the commuted winding connections from segment 56 along the full line representing the front connections of the rotor to the conductor 15, along the dotted lines representing the back connections of the rotor, by way of the segment 54 of the commutator 25, to the conductor 14, and along the full line connection to the segment 55 of the commutator 16.

The motor shown is arranged to start as a series induction machine with rotor excitation, commonly termed a "repulsion" motor, and the commuted rotor winding is therefore short-circuited by means of brushes along axes displaced from the axes of the 8-pole magnetization produced by the stator. Because the rotor winding is of the parallel and not of the series type, a brush is provided for each of the eight poles produced by the stator. Brushes of same polarity, such as 17, 19, 21 and 23 are interconnected, and are also connected to the brushes of opposite polarity, such as 18, 20, 22 and 24.

The system of windings on the rotor coöperates with the short-circuiting devices illustrated in Figs. 2 and 3. The stator laminations 2 are held in a frame 33, which is supported and centered by means of the end brackets 34, 35, with each of which is embodied a bearing in which the shaft 37 is supported. The shaft carries the rotor laminations 13 and the vertical face commutators 16 and 25 connected to each end of the commuted winding located in the rotor slots. The lower corner of each of said commutators is beveled off, as shown at 45 and 46. Coöperatively positioned with respect to these beveled surfaces are two coil springs, 40 and 44, each supported on L-shaped sleeves 38, 39 respectively, keyed to the shaft 37. Flat springs 42, 43 are so located and adjusted as to exert a pressure on the coil springs directed against the vertical faces of the sleeves 38, 39. One of the brushes 24, coöperating with the commutator 16 is also shown and is guided in a brush holder 36 carried on a projection of the end plate 35. This brush is kept in contact with the vertical commutator face by means of a spring 47.

Referring to the operation of the short-circuiting devices,—when the machine is at rest, the natural tension of the coil springs 40 and 44 keeps them in close contact with the horizontal surfaces of the sleeves 38, 39, and, therefore, out of contact with the segments of the commutators 16 and 25, but when the rotor has reached a sufficient speed, these coil springs expand and fly out, under the influence of centrifugal force, and come to occupy the positions indicated by the dotted lines 41, 48, in which they are pressed into close contact with all the commutators with which they coöperate, not only by the centrifugal force acting on them, but also by the flat springs 42 and 43. In this manner, all the segments of each of the two commutators are conductively interconnected or short-circuited, and the two commutators are not only interconnected by way of the commuted winding, but also through the shaft. Should this last feature be undesirable, then it is only necessary to insulate either one or both of the sleeves 38, 39, from the shaft 37.

It will be noted that when all segments of the commutator 25 are conductively interconnected or short-circuited, and when the same condition also exists with reference to the segments of the commutator 16, then each conductor of the commuted winding is connected to a continuous ring at each end of the rotor, thus producing the exact equivalent of a squirrel cage winding of standard construction. It may also be said that the short-circuiting of these two commutators, in the manner here described, actually converts the commuted winding into two squirrel cages, for the reason that a pair of conductors such as 14 and 15 are always connected to a common commutator segment such as 54 at one end and to different commutator segments such as 55 and 56 at the other end.

The mode of operation of the machine as a whole is somewhat as follows: The weights and the tension of the coil springs 40 and 44 are so chosen that both commutators will be totally short-circuited in the manner above described, just before the machine reaches the lowest speed for which it is designed. When it is desired to start the motor, the switch 30 is placed in the position shown in Fig. 1, thus producing the largest number of poles in the stator. The brushes coöperating with the commutator 16 are permanently located so as to give the desired torque when switch 30 is placed in the position shown. Under these conditions, the motor will start as a commutator machine in a manner now well understood and, as soon as its speed reaches the neighborhood of the synchronous corresponding to the number of poles for which the stator is connected, the short-circuiting devices will operate to convert the commuted winding into what may be described as two squirrel cages. In order to reach a higher speed, it is necessary to throw the switch 30 from points 26, 28 to points 27, 29, thus producing four instead of eight stator poles and causing the motor to reach its higher speed without the coöperation of the commutator 16 but with that of the squirrel cage windings and on a pure induction motor performance. When it is desired to drop from a higher to a lower speed, it is convenient to interrupt the stator circuits for a time sufficient to allow the rotor speed to reach the neighborhood of the synchronous corresponding to the higher number of poles, and then to close the stator switch in such a way as to produce that higher number of poles in the stator.

For the sake of a clear illustration of my invention, I have only shown eight stator and sixteen rotor slots. It is obvious that, in practice, the number of slots in both members should be considerably larger. It is also well understood that the stator may be provided with a single winding so arranged as to be capable of successively producing different numbers of poles by re-organizing the connections of its elements. While I have illustrated my invention as applied to a stator capable of producing two sets of poles, namely 4 and 8, yet it is by no means restricted to such a machine and is indeed particularly suited to a motor, the stator of which is adapted to produce more than two sets of poles.

Since the operation of the two short-circuiting devices or their equivalents converts the rotor winding into a squirrel cage as distinguished from a short-circuited pole winding, it is clearly immaterial to running performance what pitch for the commuted rotor winding is selected, and this pitch may, therefore, be so selected as to secure the most efficient action of this winding at the moment of starting, that is, when the machine operates as a commutator motor. Because of the small number of commutator segments shown in Fig. 1, the drawing would indicate that, at times, the rotor winding is totally short-circuited by the brushes, but it will be understood that this condition will not occur in practice since a much greater number of commutator segments per pole will be used.

Having fully described my invention, what I claim as new and desire to secure by Letters-Patent of the United States is:

1. In an alternating current motor, the combination of means for successively producing different numbers of stator poles, a rotor provided with a commuted winding capable of coöperating with one of the available numbers of stator poles, and means for inter-connecting all the conductors of the commuted winding at each end of the rotor.

2. In an alternating current motor, the combination of means for successively producing different numbers of stator poles, a rotor provided with a commuted winding capable of coöperating with one of the available numbers of stator poles, and a speed controlled device for inter-connecting all the conductors of the commuted winding at each end of the rotor.

3. In an alternating current motor, the combination of means for successively producing different numbers of stator poles, a rotor provided with a pole winding and two commutators each connected to said winding, and means for short-circuiting at least a part of each commutator.

4. In an alternating current motor, the combination of means for successively producing different numbers of stator poles, a rotor provided with two commutators and a pole winding each element of which is connected to both commutators, and speed controlled means for short-circuiting the commutators.

5. In an alternating current motor, the combination of means for successively producing different numbers of stator poles, a rotor provided with two commutators located at opposite ends of the rotor and with a pole winding each element of which is connected to each commutator, and means for short-circuiting the commutators.

6. In an alternating current motor, the combination of means for successively producing different numbers of stator poles, a rotor provided with a commutator and a commuted winding connected thereto and having only one turn per commutator segment, the ends of each turn being connected to different commutator segments, a second commutator having each segment connected to a different turn of the commuted winding at a point intermediate the ends of said turn, and means for short-circuiting both commutators.

7. In an alternating current motor, the combination of means for successively producing different numbers of stator poles, a rotor carrying a one-turn pole winding connected to a commutator, brushes on said commutator so located as to enable the rotor pole winding to coöperate with one number of stator poles, a second commutator having each segment connected to a different turn of the pole winding at a point intermediate the ends of said turn, and means for short-circuiting both commutators.

8. In a dynamo electric machine, a rotor provided with a commuted pole winding and means for converting said winding into one or more squirrel cage windings.

9. In a dynamo electric machine, a rotor provided with two commutators and a commuted winding each element of which is connected to both commutators, and means for short-circuiting said commutators.

10. In a dynamo electric machine, a rotor provided with a commutator and a commuted winding connected thereto and having only one turn per commutator segment, the ends of each turn being connected to different commutator segments, a second commutator having each segment connected to a different turn of the commuted winding at a point intermediate the ends of said turn, and means for short-circuiting both commutators.

11. In a dynamo electric machine, a rotor provided with two commutators located at opposite ends of the rotor and with a commuted winding each element of which is connected to each commutator, and speed controlled means for short-circuiting the commutators.

In testimony whereof, I have hereunto set my hand and affixed my seal in the presence of the two subscribing witnesses.

HANS WEICHSEL. [L. S.]

Witnesses:
CATHERINE SCHIESS,
HARRY HENZE.